United States Patent [19]

Okamoto et al.

[11] Patent Number: 4,760,599
[45] Date of Patent: Jul. 26, 1988

[54] DATA ENCRYPTOR

[75] Inventors: Eiji Okamoto; Katsuhiro Nakamura, both of Tokyo, Japan

[73] Assignee: NEC Corporation, Japan

[21] Appl. No.: 925,891

[22] Filed: Oct. 30, 1986

[30] Foreign Application Priority Data

Nov. 7, 1985 [JP] Japan .................................. 60-250230
Nov. 7, 1985 [JP] Japan .................................. 60-250231

[51] Int. Cl.⁴ .............................................. H04L 9/00
[52] U.S. Cl. ......................................... 380/48; 380/44
[58] Field of Search ...................... 380/23, 25, 37, 50, 380/48, 28; 340/347 DD

[56] References Cited

U.S. PATENT DOCUMENTS

| 4,074,066 | 2/1978 | Ehrsam et al. | 380/37 |
| 4,159,468 | 6/1979 | Barnes et al. | 380/23 |
| 4,304,961 | 12/1981 | Campbell, Jr. | 380/23 |
| 4,314,097 | 2/1982 | Campbell, Jr. | 380/23 |
| 4,447,672 | 5/1984 | Nakamura | 380/50 |

Primary Examiner—Salvatore Cangialosi
Assistant Examiner—Aaron J. Lewis
Attorney, Agent, or Firm—Ostrolenk, Faber, Gerb & Soffen

[57] ABSTRACT

A data converter applicable to data communications protects messages against errors and modifications by a third party. What is required for the detection of errors and modifications is simply causing a transmit station to add a particular pattern and a receive station to detect the particular pattern.

4 Claims, 7 Drawing Sheets

FIG. 9

| 0 | 1 | 2 | 3 | 4 | 5 | 6 | 7 | |
|---|---|---|---|---|---|---|---|---|
| $K_0$ | $K_1$ | $K_2$ | $K_3$ | $K_4$ | $K'_0$ | $K'_1$ | $K'_2$ | WORD |
| $K_5$ | $K_6$ | $K_7$ | $K_8$ | $K_9$ | | | | WORD |
| $K_{10}$ | $K_{11}$ | $K_{12}$ | $K_{13}$ | $K_{14}$ | | | | WORD |
| $K_{15}$ | $K_{16}$ | $K_{17}$ | $K_{18}$ | $K_{19}$ | | | | WORD |
| | | | | | | | | WORD |
| | | | | | | | | WORD |
| | | | | | | | | WORD |
| | | | | | | | | WORD |

DATA ENCRYPTOR

BACKGROUND OF THE INVENTION

The present invention relates to a data converter for protecting data communications against errors and modifications by a third party.

In packet communication, when a receive station has detected an error in any of the packets received, it in many cases discards the packet and sends a re-transmit request to a transmit station. In such a case, use is made of an error detector code. It has been reported that in a communication system of the type using encryption and decryption principles data can be protected against modifications by a third party if they are subjected to error detection coding before encryption, as disclosed in, for example, "Message Authentication" by R. R. Jueneman et al, IEEE Communication Magazine, Vol. 23, No. 9, September 1985, pages 29–40. However, when combined with a cryptograph, error detection coding cannot be made simple, as compared to a case without a cryptograph.

SUMMARY OF THE INVENTION

It is an object of the present invention to provide a data converter which eliminates the drawback stated above.

It is another object of the present invention to provide a data converter which allows errors and modifications of data to be detected simply by causing a transmit station to add a particular pattern and a receive station to detect that particular pattern.

It is another object of the present invention to provide a generally improved pattern detector.

A data converter for converting a data digit according to the present invention, comprises a store means for storing a digital pattern, a pattern converter for producing a digit which is dependent on the digital pattern, an adder for determining by modulo-M addition (M being a positive integer) a sum of the data digit and the digit which is outputted by the pattern converter, and a rewriting device for rewriting at least one of digits of the digital pattern which is stored in the store into a modulo-M sum of a digit which is outputted by the adder and one or a plurality of digits of the digital pattern, and rewriting at least one digit of the digital pattern into a modulo-M sum of at least two digits of the digital pattern. The sum which is outputted by the adder is delivered as output data.

In accordance with the present invention, a data converter applicable to data communications protects messages against errors and modifications by a third party. What is required for the detection of errors and modifications is simply causing a transmit station to add a particular pattern and a receive station to detect the particular pattern.

The above and other objects, features and advantages of the present invention will become more apparent from the following detailed description taken with the accompanying drawings.

BRIEF DESCRIPTION OF THE DRAWINGS

FIG. 9 shows a key pattern.

DESCRIPTION OF THE PREFERRED EMBODIMENTS

Figure 1:
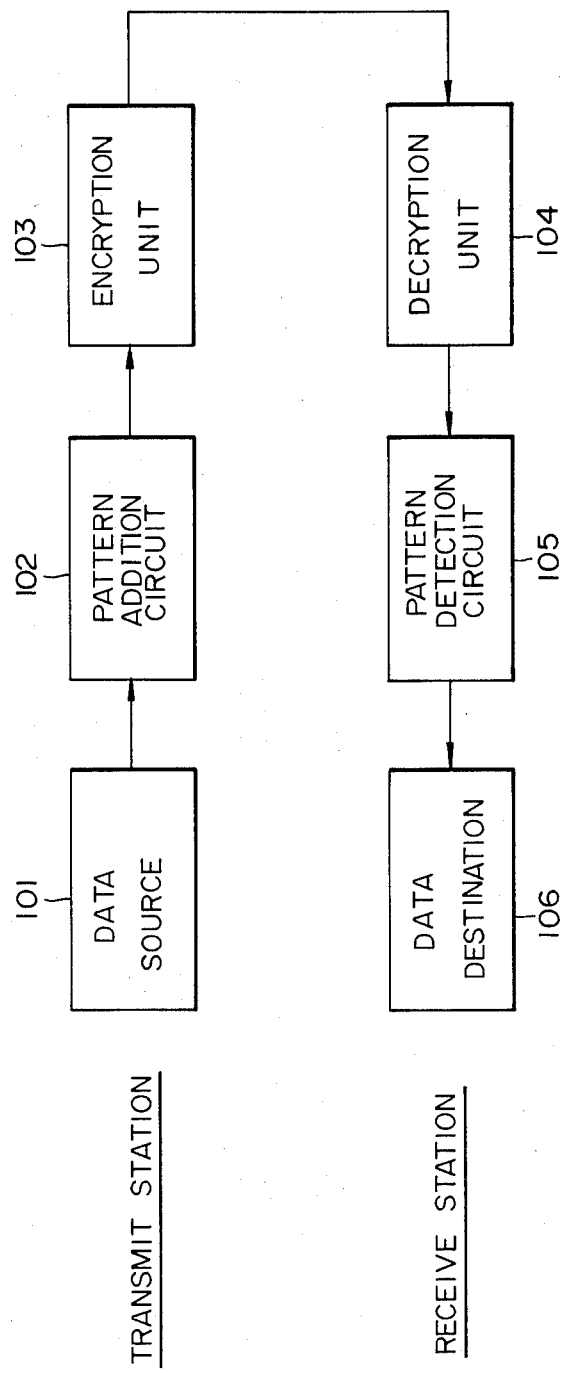
FIG. 1 is a block diagram showing the principle of operation of the present invention.

Referring to FIG. 1 of the drawings, the principle of operation of the present invention is shown in a block diagram. As shown, a transmit station includes a data source 101 which generates a packet, a pattern addition circuit 102 which adds a particular pattern to the end of the packet, and an encryption unit 103 which encrypts the packet. A receive station, on the other hand, includes a decryption unit 104 for decrypting the packet which is transmitted to the receive station from the transmit station, and a pattern detection circuit 105 for deciding whether or not the particular pattern follows the packet. Specifically, the circuit 105 decides that the packet received is free from an error and free from modification if the same particular pattern as the one transmitted follows the packet, and that the packet involves an error or a modification if the pattern which follows the packet is different from the one transmitted. An output of the circuit 105, i.e., the packet having undergone such decision, is applied to a data destination 106. Where both the encryption unit 103 and the decryption unit 104 are of the type which causes any bit error brought about on a transmission channel to be propagated all the way to the end of the packet, the influence of a data error that has occurred during transmission or the influence of a modification of data by a third party appears also in the particular pattern which is located at the end of the packet, causing the particular pattern to undergo a change. Such a change in the particular pattern makes it possible for an error or a modification of data to be detected.

Examples of an encryption unit and a decryption unit of the error propagation type as stated above will be described as embodiments of the present invention.

Figure 2:
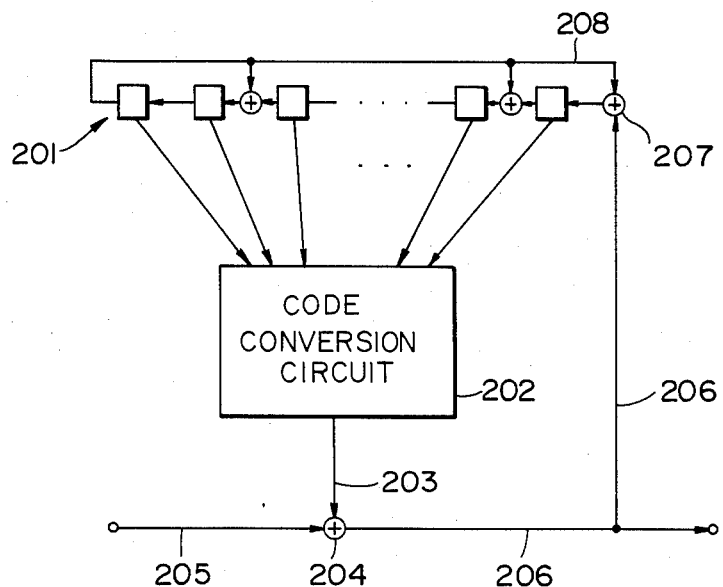
FIGS. 2 to 8 are block diagrams showing various embodiments of the present invention.

Referring to FIG. 2, a first embodiment is shown in a block diagram in which all the data are assumed to have binary representation for the clarity of description. In FIG. 2, a shift register 201 stores a bit pattern which is representative of an internal condition thereof and, in an initial condition, stores an initial pattern. The shift register 201 is provided with a feedback section which leads from the highest bit of the shift register. The wiring structure of the feedback section may be implemented with a one which is used with an M-sequence generator. A code conversion circuit 202 produces one bit 203 by converting a bit pattern which is stored in the shift register 201 and representative of a particular internal condition, the one bit 203 being fed to an Exclusive-OR (EX-OR) element 204. In response, the EX-OR element 204 produces EX-OR of the output bit 203 of the circuit 202 and an input bit 205, the EX-OR being delivered as an output bit 206. Another EX-OR element 207 is supplied with the output bit 206 of the EX-OR element 204 and a bit 208 which is outputted by the highest bit of the shift register 201, the resulting EX-OR being applied to the lowest bit of the shift register 201. By such a procedure, the internal condition of the shift register 201 is changed.

Figure 3:
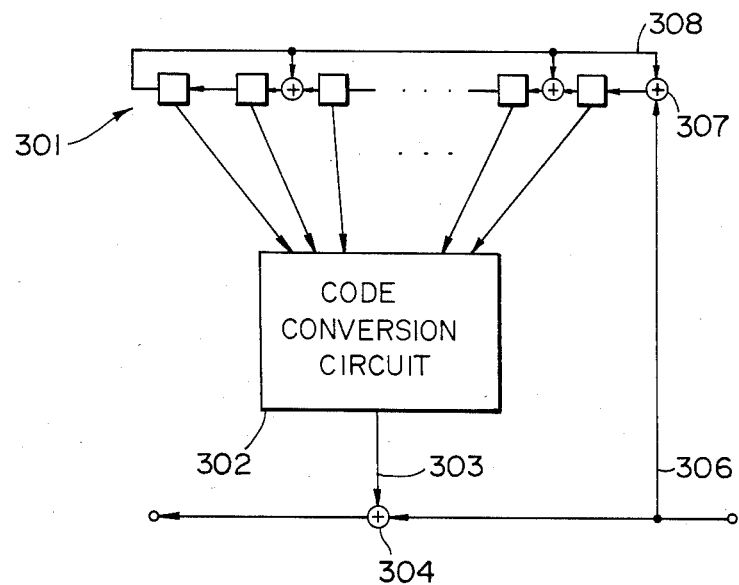

FIG. 3 shows a second embodiment in a block diagram in which, too, all the data are assumed to be binary data. In FIG. 3, a shift register 301 is provided with a feedback section as has been the case with the shift register 201. The difference is that it is EX-OR of a bit outputted by the highest bit of the shift register 301 and an input bit to an apparatus of the present invention that is applied to the lowest bit of the shift register 301. The rest of the construction is identical with that of FIG. 2.

One of the first and second embodiments is used for encryption purpose and the other for decryption purpose. The reason why an error occurred on a transmission channel is expanded is because the error once entered the shift register cannot be dissipated therefrom. When the same initial pattern is loaded initially in the shift register 201 and the shift register 301, original binary data will be restored after decryption, provided no error exists. This is because so long as the internal conditions of the two shift registers are identical, the output bits of the code conversion circuits are identical so that after the decryption the same bit is modulo-2 added twice to the data bit which has not undergone encryption. Because the lowest bit of the shift register 201 and that of the shift register 301 are loaded with the same bit, the contents of the two shift registers are identical with each other. When any error has occurred on the transmission channel, the contents of the two shift registers do not agree with each other after decryption. An arrangement is made such that upon disagreement of the patterns as mentioned above a packet is re-transmitted so as to bring the initial patterns into agreement at the initial stage of a packet; then, the re-transmission of a packet successfully removes an error. The initial pattern may be used as a key. The code conversion circuits 202 and 304 may each comprise a read only memory (ROM) or a random access memory (RAM).

Figure 4:
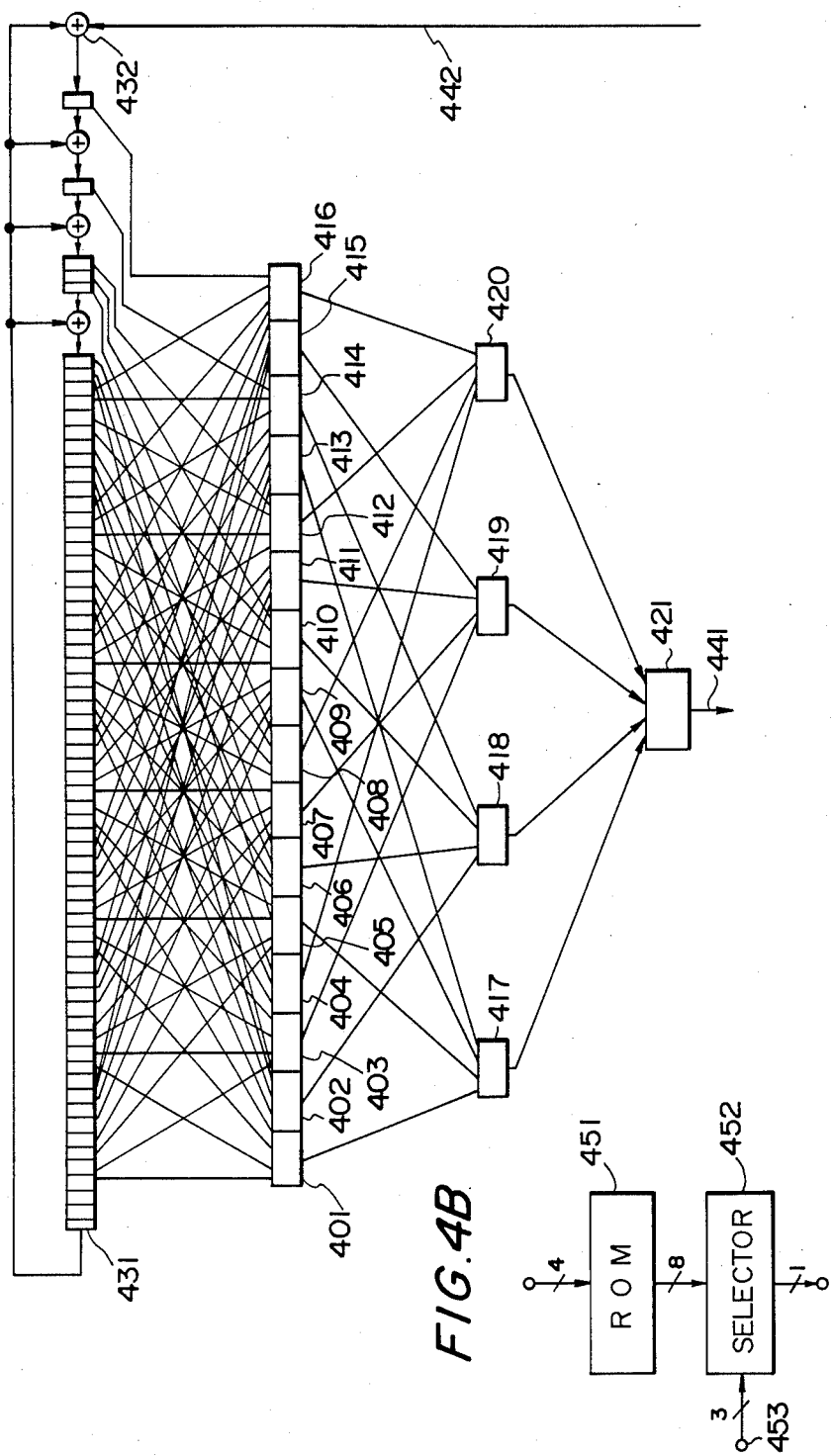

Referring to FIG. 4A, a third embodiment is shown. In FIG. 4A, a shift register which corresponds to the shift register 201 of the first embodiment or that 301 of the second embodiment is designated by the reference numeral 431. A line 441 leads to an element which corresponds to the EX-OR element 204 of the first embodiment or that 304 of the second embodiment. Further, a line 442 corresponds to the output 206 or input 306. The shift register 431 has sixty-seven consecutive stages and, in an initial condition, is loaded with an initial pattern. The reference numerals 401 to 421 each designate a circuit which, as shown in FIG. 4B, consists of a ROM 451 and a selector 452. Specifically, the ROM 451 comprises a 16-by-8 bits ROM and responds to a 4-bits address input by producing eight bits which are stored in a designated address. The selector 452, on the other hand, selects one of the eight bits which are applied thereto from the ROM 451 in response to a part (three bits) of a key pattern which is also applied thereto via an input terminal 453.

It is to be noted that in FIG. 4A the input terminal 453 shown in FIG. 4B is not shown for the clarity of illustration. The ROM 421 comprises a 16-by-1 bits ROM. The key pattern is made up of sixty bits which are applied by three bits to the respective ROMs 401 to 420. The pattern which is stored in the ROM 401 to 421 is a random pattern such as a physically random pattern. This random pattern may be used as a key.

In any of the embodiments shown and described, the shift registers may comprise RAMs while the ROMs may be replaced with non-volatile RAMs. Further, all the ROMs 401 to 421 of FIG. 4A may be implemented with 16-by-1 bits ROMs in which case the initial pattern may be used as a key. These and other possible modifications fall within the scope of the present invention.

Figure 5:
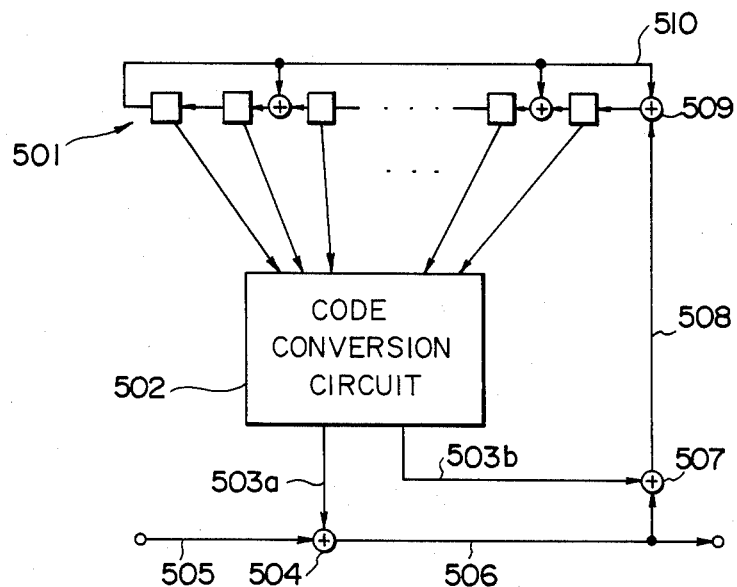

Referring to FIG. 5, a fourth embodiment of the present invention is shown in which all the data are assumed to have binary representation as in the first and second embodiments. In FIG. 5, a shift register 501 stores a bit pattern which is representative of an internal condition thereof and, in an initial condition, it stores an initial pattern. The shift register 501 is provided with a feedback section which leads from the highest bit of the shift register. The wiring structure of the feedback section may be implemented with a one which is used with an M-sequence generator. A code conversion circuit 502 is adapted to convert a bit pattern stored in the register 501 so as to produce two bits 503a and 503b. An EX-OR element 504 EX-ORs one, 503a, of the outputs of the circuit 502 and an input bit 505, thereby producing an output bit 506. Another EX-OR element 507 EX-ORs the other output bit 503b of the circuit 502 and the output bit 506 of the EX-OR element 504, thereby producing an output bit 508. Still another EX-OR element 509 EX-ORs the output bit 508 and an output of the highest bit of the shift register sequence 501, the EX-OR being fed to the lowest bit of the shift register 501. As a result, the internal condition of the shift register 501 is changed.

Figure 6:
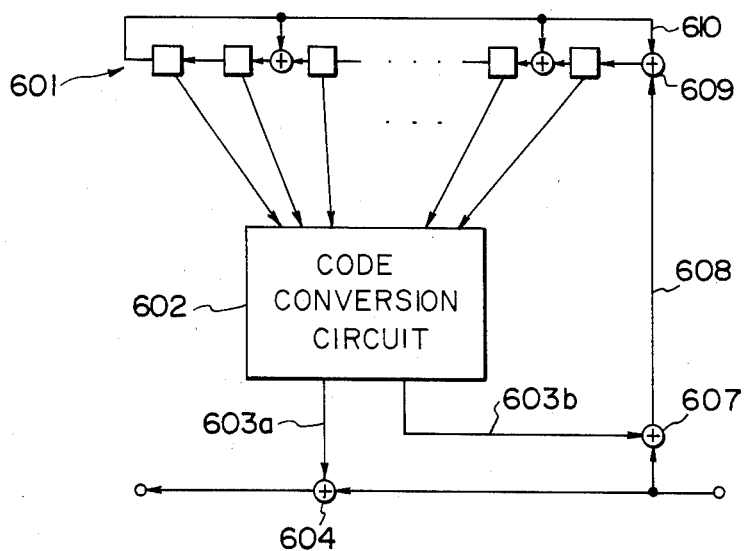

Referring to FIG. 6, a fifth embodiment of the present invention is shown in which, as in the fourth embodiment, data are assumed to be binary data. In FIG. 6, a shift register 601, like the shift register 501, is provided with a feedback section. The difference is that it is an EX-OR of a bit outputted by the highest bit of the shift register 601 and an EX-OR of an input bit to the apparatus of the present invention and an output of a code conversion circuit 602 that is applied to the lowest bit of the shift registers 601. The rest of the construction of FIG. 6 is the same as FIG. 5.

One of the fourth and the fifth embodiments is used for encryption purpose and the other for decryption purpose. The reason why an error occurred on a transmission channel is expanded is because once an error has entered the shift register it cannot be removed. When the same initial pattern is loaded initially in the shift register 501 and the shift register 601, original binary data will be restored after decryption, provided no error exists. This is because so long as the internal conditions of the two shift registers are identical, the output bits of the code conversion circuits are identical so that after the decryption the same bit is modulo-2 added twice to the data bit which has not undergone encryption. Because the lowest bit of the shift register 501 and that of the shift register 601 are loaded with the same bit, the contents of the two shift registers are identical with each other. When any error has occurred on the transmission channel, the contents of the two shift registers do not agree with each other after decryption. An arrangement is made such that upon disagreement of the patterns as mentioned above a packet is re-transmitted so as to bring the initial patterns into agreement at the initial stage of a packet; then, the retransmission of a packet successfully removes an error. The initial pattern may be used as a key. The code conversion circuits may each comprise a ROM or a RAM which is commercially available.

Figure 7:
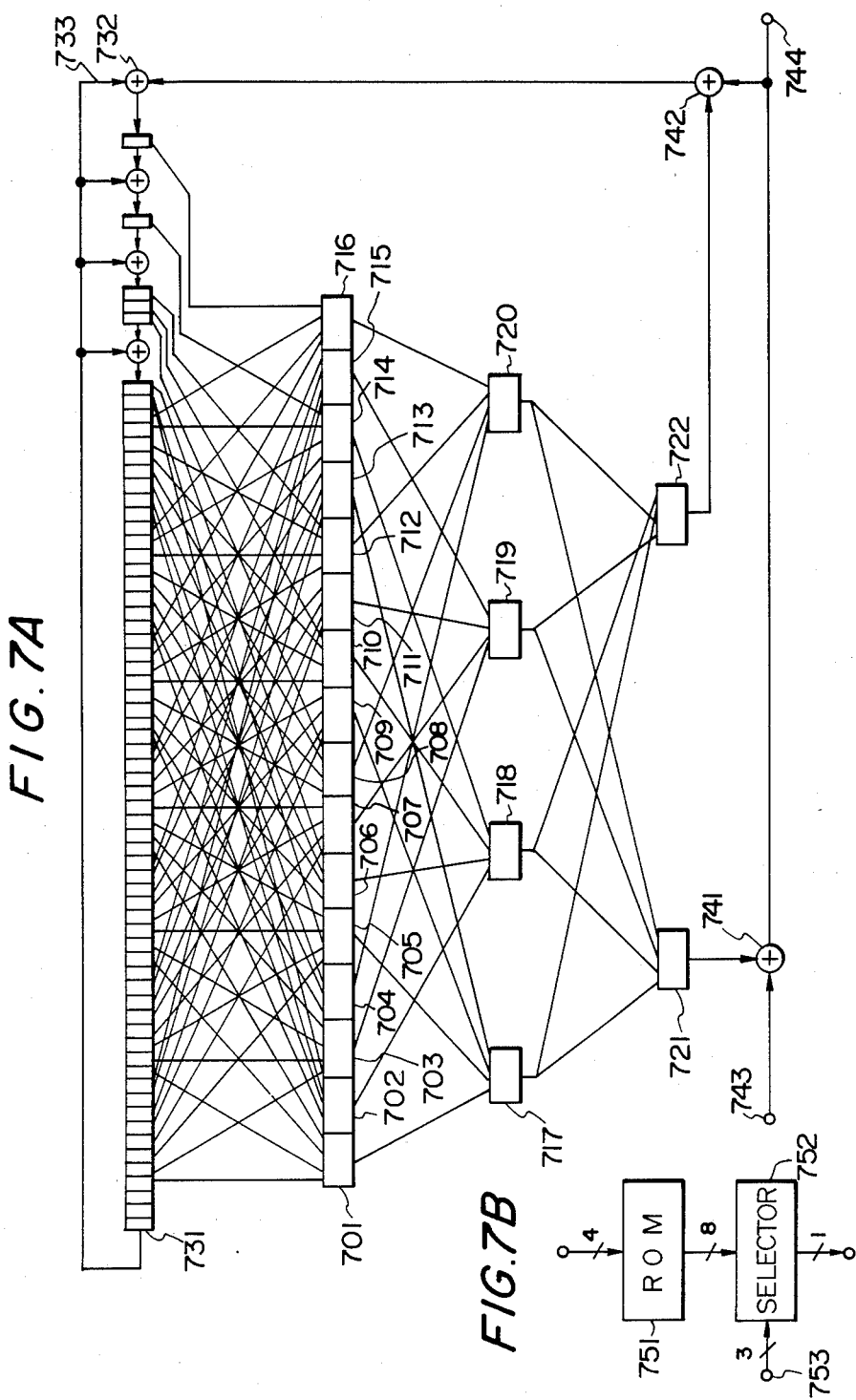

Referring to FIG. 7A, a sixth embodiment of the present invention is shown in a block diagram. In FIG. 7A, the reference numeral 731 designates a shift register having sixty-seven stages and which in an initial condition is loaded with an initial pattern. The reference numerals 701 to 722 designate circuits each of which, as shown in FIG. 7B, consists of a ROM 751 and a selector 752. The ROM 751 comprises a 16-by-8 bits ROM which responds to a 4-bits address input by producing eight bits which are stored in the designated address.

The selector 752 selects one of the eight bits as produced by the ROM 751 in response to a part (three bits) of a key pattern, which is applied to the selector 752 via an input terminal 753, thereby outputting one bit.

It is to be noted that the input terminal 753 of FIG. 7B is not shown in FIG. 7A for the clarity of illustration. The circuits 721 and 722 each comprise a 16-by-1 bits ROM. A key pattern is made up of sixty bits which are applied by three bits to the respective circuits 701 to 720. An output of the ROM 721 and an input bit 741 via the input terminal 743 are EX-ORed by an EX-OR element 741 and output of which is in turn applied to an output terminal 744. An output of the ROM 722 and the output of the EX-OR 741 are EX-ORed by an EX-OR element 742. An output of the EX-OR element 742 and the highest bit 733 of the shift register 731 are EX-ORed by an EX-OR element 732, an output of the EX-OR element 732 being fed to the lowest bit of the shift register 731. The output of the ROM 721 is applied to the EX-OR element 741 once per eight times. That is, the shifting operation of the shift register 731 is effected an eight times higher rate than the data bits which are to be encrypted. Hence, the EX-OR element 741 only is operated at a one-eighth clock rate. It is to be noted, however, that the numerical value "8" used here may naturally be replaced with "1." The pattern which is stored in the ROMs of the circuits 701 to 722 is a random pattern such as a physically random pattern. This pattern may be used as a key.

Although not shown in the drawings, a seventh embodiment may be derived from the sixth embodiment, i.e., by using the output terminal 744 of FIG. 7A as an input terminal and the input terminal 743 as an output terminal such that an output bit of the circuit 721 and a bit from the input terminal 744 are applied to the EX-OR element 741, and an output of the element 741 is fed to the output terminal 743. It will be apparent that the sixth and seventh embodiments are opposite to each other with respect to the circuit arrangement.

Figure 8:
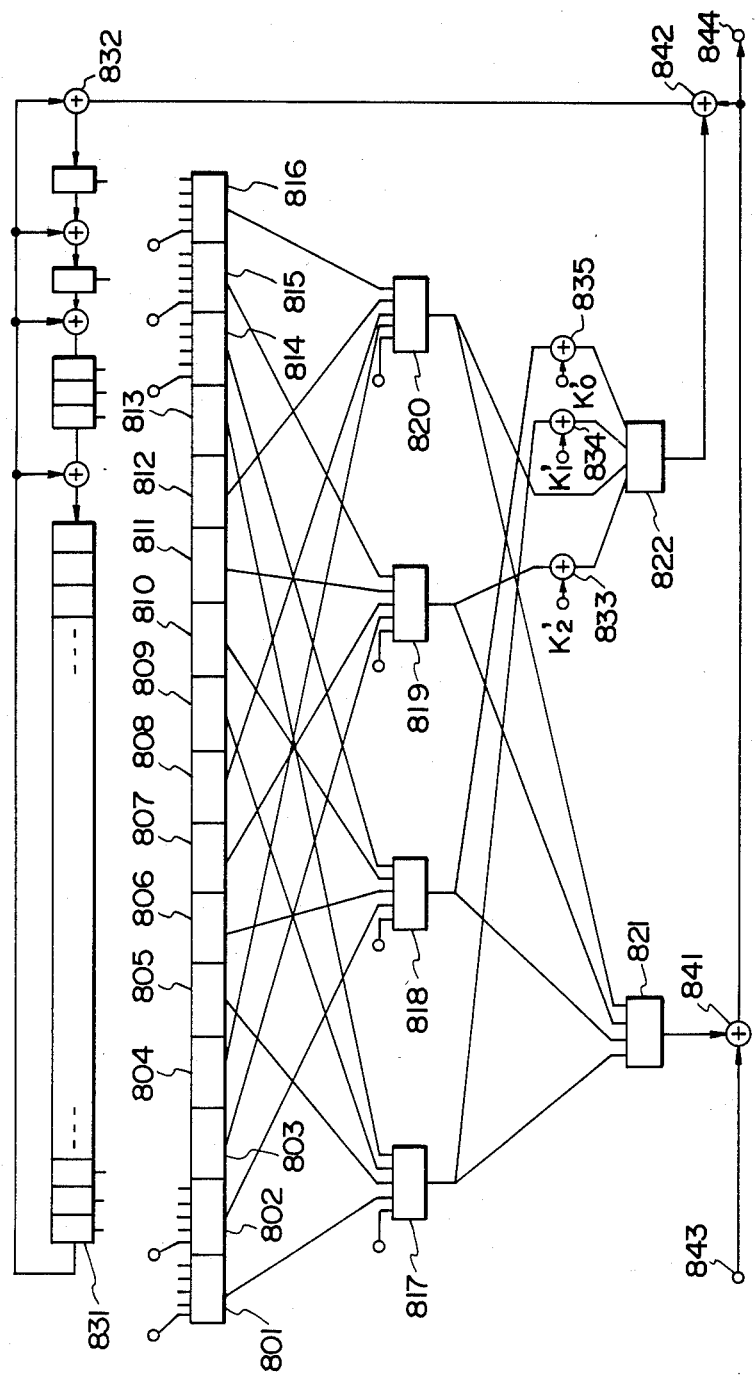

Referring to FIG. 8, an eighth embodiment of the present invention is shown. The reference numeral 831 designates a shift register having sixty-seven consecutive stages. Designated by the reference numerals 801 to 820 are 32-by-1 bits ROMs, and designated by the reference numerals 821 and 822 are 16-by-1 bits ROMs. Each of the ROMs 801 to 820 has five address input bits the highest one of which is assigned to one bit of a key pattern. The remaining four bits of each ROM and the shift register 831 or the output of the ROM are interconnected as shown in FIG. 7A. It is to be noted that three bits of the input to the ROM 822 are constituted by EX-OR of three bits of the key pattern and outputs of the ROMs 817, 818 and 819. Assume that the three bits of the key pattern are $k'_0$, $k'_1$ and $k'_2$, and that inputs from the key pattern associated with the ROMs 801 to 820 are $k_0, k_1, \ldots, k_{19}$, respectively. The whole key pattern is made up of sixty-four bits which are arranged by each eight bits in eight words in total.

FIG. 9 shows a key pattern which is arranged in words. In this embodiment, as in the sixth embodiment shown and described, it is assumed that one bit of data is converted in response to eight clock pulses. Let $k'_0$, $k'_1$, $k'_2$, $k_0, k_1, \ldots, k_{19}$ be the bits at particular positions as shown in FIG. 9. Every time the clock advances, the words of the key are shifted circulatingly on a word-by-word basis. Specifically, the uppermost row in FIG. 9 is shifted to the lowermost row while the other rows are shifted upwardly by one row each. Hence, the word pattern is restored to original by the eighth clock. Here, the bits $k'_0$, $k'_1$, $k'_2$ and the bits $k_0, k_1, \ldots, k_{19}$ are assumed to constantly remain in the same relative position. That is, those bits which are located as shown in FIG. 9 are used as the bits $k'_0$, $k'_1$, $k'_2$ and the bits $k_0, k_1, \ldots, k_{19}$. The other wirings are the same as those of FIG. 7A.

A ninth embodiment may be derived from the eighth embodiment in the same manner as the seventh embodiment has been derived from the sixth embodiment, as previously stated. Again, the ninth embodiment will be opposite in circuit construction to the eighth embodiment.

It is to be noted that in FIG. 8 all or a part of the ROMs 801 to 820 may be shared during operation so as to save ROMs.

Furthermore, all the circuits 701 to 722 of FIG. 7A may be implemented with ROMs in which case the initial pattern which is stored in the shift register may be used as a key. These and other modifications fall within the scope of the present invention.

In summary, it will be seen that the present invention provides a data converter which is effectively applicable to data communications since it detects errors and modifications of data simply by causing a transmit station to add a particular pattern to a message and a receive station to detect the particular pattern.

What is claimed is:

1. A data encryptor for converting an input data digit, comprising:
   store means for storing a digital pattern comprising a plurality of digits;
   pattern converter means for producing a digit which is dependent on said digital pattern;
   adder means for determining by modulo-M addition (M being a positive integer) a sum of the input data digit and said digit which is outputted by said pattern converter means, and outputting a sum digit; and
   rewriting means for
      rewriting at least one of the digits of the digital pattern which is stored in said store means into a modulo-M sum of said sum digit which is outputted by said adder means, and one or a plurality of the digits of said digital pattern, and
      rewriting at least one digit of said digital pattern into a modulo-M sum of at least two digits of said digital pattern;
   said sum digit which is outputted by said adder means being delivered as output data.

2. A data encryptor for converting an input data digit, comprising:
   store means for storing a digital pattern comprising a plurality of digits;
   pattern converter means for producing a digit which is dependent on said digital pattern;
   adder means for determining by modulo-M addition (M being a positive integer) a sum of the input data digit and said digit which is outputted by said pattern converter means and outputting a sum digit; and
   rewriting means for
      rewriting at least one of the digits of the digital pattern which is stored in said store means into a modulo-M sum of the input data digit, and one or a plurality of the digits of said digital pattern, and rewriting at least one digit of said digital pattern into a modulo-M sum of at least two digits of said digital pattern;

said sum digit which is outputted by said adder means being delivered as output data.

3. A data encryptor for converting an input data digit, comprising:

store means for storing a digital pattern comprising a plurality of digits;

pattern converter means for outputting at least two digits which are dependent upon said digital pattern;

adder means for producing by modulo-M addition (M being a positive integer) a sum of the input data digit and at least one digit which is outputted by said pattern converter means and outputting a sum digit; and rewriting means for rewriting at least one digit of said digital pattern which is stored in said store means into a modulo-M sum of said sum digit outputted by said adder means, at least one digit outputted by said pattern converter means, and one or a plurality of digits of said digital pattern, and rewriting at least one digit of said digital pattern into a modulo-M sum of at least two digits of said digital pattern;

said sum digit which is outputted by said adder means being delivered as output data.

4. A data encryptor for converting an input data digit, comprising:

store means for storing a digital pattern comprising a plurality of digits;

pattern converter means for outputting at least two digits which are dependent on said digital pattern;

adder means for producing by modulo-M addition (M being a positive integer) a sum of the input data digit and at least one digit which is outputted by said pattern converter means and outputting a sum digit; and rewriting means for rewriting at least one digit of said digital pattern which is stored in said store means into a modulo-M sum of the input data digit, at least one digit outputted by said pattern converter means, and one or a plurality of digits of said digital pattern, and rewriting at least one digit of said digital pattern into a modulo-M sum of at least two digits of said digital pattern;

said sum digit which is outputted by said adder means being delivered as output data.

* * * * *